3,529,974
NOVEL VEGETABLE OIL
Daniel Melnick, West Englewood, and Arthur E. Waltking, Fair Lawn, N.J., assignors to CPC International Inc., New York, N.Y., a corporation of Delaware
No Drawing. Filed Mar. 29, 1967, Ser. No. 626,706
Int. Cl. A23d 5/00
U.S. Cl. 99—118                              16 Claims

ABSTRACT OF THE DISCLOSURE

A vegetable oil having properties similar to corn oil is prepared by blending together, in specified proportions, the following refined bleached oils: an oil of high P/S ratio such as safflower or sunflower oil; a modified soybean oil; winterized cottonseed oil; and peanut oil. The blend is subsequently deodorized.

---

This invention relates to the preparation of a liquid, edible vegetable oil. More specifically, the invention relates to the preparation of a vegetable oil having substantially the same composition, nutritional value, and physical properties as corn oil.

Of the several refined edible vegetable oils which are customarily used as salad or cooking oils in this country, corn oil is generally considered to be superior to the others in overall characteristics. Refined corn oil has the best balance in composition and physical properties. Composition in turn defines nutritional value. Being high in polyunsaturates (P) and low in saturates (S), it provides a high P/S ratio of about 4.5. Whereas other oils may have even higher P/S ratios (viz, safflower and sunflower oils), these have poor flavor stability. With the present-day improved methods of refining, corn oil is now a bland oil having an improved flavor stability that is far superior to that of the other polyunsaturated vegetable oils, due predominantly to the presence of a high proportion of the right types of tocopherols for protecting flavor. It is low in color and exhibits excellent cold stability, no "clouding" occurring after 60 hours exposure at 32° F. (cold test value).

Among the other available domestic vegetable seed oils, safflower oil has excellent cold stability and a very high degree of unsaturation, with an iodine value of more than 140, and a P/S ratio of more than 6. However, this oil has very poor flavor stability. This is attributed to a poor balance of natural antioxidants (tocopherols) relative to the polyunsaturated fatty acids. Off flavor rapidly occurs when safflower oil is used, particularly in fryings. Sunflower oil is quite similar to safflower oil in the properties discussed; it also has a very high P/S ratio, about 5.

Cottonseed oil has good flavor stability and is nutritionally desirable, due in part to its high concentration of vitamin E (alpha tocopherol). However, it is fairly high in saturated fatty acids, with an iodine value generally about 110, and a relatively low P/S ratio of about 2. It has poor cold stability. This has made it mandatory to winterize cottonseed oil. The removal of the high melting, more-saturated stearine improves the nutritional composition to a very limited degree, while making the oil usable in salad dressings because of improved cold stability 5 to 20 hours, cold test value). Nevertheless, even winterized cottonseed oil continues to deposit solid fat when stored in a home refrigerator for any appreciable period of time.

Soybean oil has a fairly high iodine value of about 132 and a favorable P/S ratio of about 4, and is almost as good as corn oil in cold stability. However, soybean oil reverts in flavor and odor to those described as being painty, fishy, grassy in character and this reversion cannot be eliminated to any great degree by present-day refining and deodorization practices. In order to provide a soybean oil which is satisfactory as a cooking or salad oil, it is usually lightly hydrogenated. This results in an oil having a relatively low iodine value of about 110, a P/S ratio of about 2.5 and a zero hour cold test value. After winterization, its cold stability is improved to about 5 to 20 hours, about the same as that for winterized cottonseed oil. The nutritional index is improved only slightly, the P/S ratio now being about 3. Soybean oil has a high concentration of the right types of tocopherols for improved flavor stability, but its high concentration of linolenic acid, which still resists the hydrogenation process, more than nullifies this advantage.

Peanut oil has excellent flavor stability in spite of its low tocopherol content; this is attributed to its relatively low polyunsaturated fatty acid content. It has an iodine value of about 95, and a low ratio of polyunsaturated fatty acids to saturated fatty acids (P/S ratio of about 1.5). It has very poor stability at cold temperatures, setting up as a solid gel of fine crystalline structure within a few minutes at 32° F. (0 hours, cold test value).

It is apparent from the above that none of the popular vegetable seed oils of domestic origin has the desirable balance of corn oil as to composition, physical and nutritional characteristics. Because of the increasing awareness of the desirable properties of corn oil, it would be expected to be used more and more extensively by both homemakers and commercial food manufacturers in the preparation of oil-containing foods such as fried products, cakes, margarine, mayonnaise, salad dressings, and the like. However, the present-day increased usage is only a small part of what it could be if corn oil were freely available. Corn oil is a by-product of corn refining practices and so available supplies have not been able to keep pace with demand. Hence, it is highly desirable to be able to prepare, from vegetable oils other than corn oil, an alternate oil which has essentially the same composition, physical and nutritional characteristics as corn oil.

It is an object of the present invention to prepare a liquid, edible vegetable oil having essentially the same composition an physical properties as refined corn oil.

A further object of the invention is to prepare a liquid, edible vegetable oil which has substantially the same nutritional value as corn oil.

An additional object of the invention is to prepare a liquid, edible vegetable oil which has essentially the same properties with respect to cold stability as corn oil.

Another object is to prepare a liquid, edible vegetable oil which can be readily substituted for corn oil in the preparation of oil-containing foodstuffs in cooking, frying, baking, and mixing operations.

Other objects of the invention will appear hereinafter from the specification and from the recitals of the appended claims.

In accordance with our invention, an edible oil composition or blend is prepared by blending the following ingredients: from 35% to 45% by weight of a refined, bleached vegetable oil of very high P/S ratio; from 25% to 50% by weight of refined, bleached soybean oil which has been lightly hydrogenated and winterized, as will be described more fully hereinafter as the modified soybean oil; from 15% to 25% by weight of refined, bleached winterized cottonseed oil, and from 2% to 10% by weight of refined, bleached peanut oil. Preferably the edible oil composition is prepared by blending from 38% to 42% by weight of refined and bleached vegetable oil of high P/S ratio; from 30% to 40% by weight of refined, bleached soybean oil which has been lightly hydrogenated and winterized; from 18% to 22% by weight of refined, bleached winterized cottonseed oil; and from 3% to 8% by weight of refined, bleached peanut oil.

The vegetable oil of very high P/S ratio is one other than corn oil and which has a ratio of polyunsaturates (P) to saturates (S) in excess of 4.5. Two such oils, which are suitable in the practice of the invention, are safflower oil and sunflower oil. When safflower oil is used as the vegetable oil of high P/S ratio, the preferred proportions given above, of 38% to 42% high P/S ratio vegetable oil and 18% to 22% cottonseed oil, apply. When sunflower oil of somewhat lower P/S ratio is added in place of safflower oil, it is preferably present in the blend in an amount of 40% to 45% by weight, and the cotton seed oil is preferably reduced to its lower limits of concentration, such as 15% to 20%.

The soybean oil component of our blend is a refined, modified soybean oil with an iodine value of from 100 to 120, preferably 110 to 120, which has been hydrogenated to within this range of iodine values at a temperature less than 245° F., preferably from 195° F. to 220° F., and then winterized. The oil has less than 1% of conjugated dienoic acid components, less than 0.02% of conjugated trienoic acid components, and less than 0.002% of conjugated tetraenoic acid components. This oil is essentially that described by C. M. Gooding in U.S. Pat. No. 2,627,467, issued Feb. 3, 1953. It was discovered in our study that this oil contributes surprisingly to the cold stability of the final blend. This modified soybean oil contains from 10% to 20% trans fatty acid isomers. The iso-acids in this soybean oil and the gelatinous type stearine which comes out of peanut oil, when held as such in the cold, are believed to contribute to the viscosity of our novel oil blends to prevent settling out of a stearine fraction.

The cottonseed oil in our blend is the conventional winterized oil, while the peanut oil is the conventional product of zero cold test value and typically one which is unable to be winterized. The peanut oil may vary in concentration from the 2% to 10% specified; however, as concentration varies within this range, the change preferably should be paired off with a reciprocal change of about twice the amount in the concentration of the modified soybean oil component in our blend.

The iodine value of the novel oil blends of this invention is between 120 and 130 and preferably between 123 and 128. These are the same ranges of iodine values for corn oils from domestic sources. The P/S ratio of our oil blend is within the range of 3.5 to 4.5, almost the same as that for corn oil. The oil blend of this invention is preferably deodorized as the final blend, rather than being a composite of deodorized component oils; some of the latter lack per se desired flavor stability.

If the oil blend is likely to be held in the refrigerator (vis, at 45° F. or lower) for extended periods of time, it is desirable to add a small amount of about 0.01% to 0.03% by weight of a crystallization inhibitor such as oxystearin. Other suitable crystallization inhibitors such as, for example, polyoxyethylene esters of fatty acids, sucrose esters of fatty acids, or the like, may also be used. The addition of oxystearin is not essential but represents an improvement which works in conjunction with the modified soybean oil and peanut oil for increased cold stability. The oil blends of the present invention have cold test values in excess of 20 hours at 32° F., and preferably in excess of 30 hours, with the small amount of stearine precipitate not increasing substantially during the next 70 hours at 32° F. Conventional additives such as antioxidants, metal chelating agents and other stabilizers may also be added to the oil blends of this invention.

The novel oil blends of this invention are obtained by a simple blending together of individual components in the proportions recited. Fatty acid compositions can be calculated for the blends, but not cold stability values. Without proper resistance to stearine precipitation in the refrigerator, the new oil blends would never be accepted by the housewife or the food processor as an alternate to corn oil, regardless of fatty acid composition. It is generally agreed that the oil component of lowest cold test values exerts a dominent influence on the cold test value of a blend. For example, peanut oil, when alone completely solidifies within a few minutes when brought to 32° F., and after being mixed with more than equal volume of the most unsaturated of the edible vegetable oils (safflower oil, with a cold test value in excess of 70 hours at 32° F.), the cold test value of the mixture still remains less than 1.0 hour at 32° F. Such a blend of safflower oil and peanut oil might show a fatty acid composition similar to that of corn oil, but it would never be accepted as a substitute for corn oil due to its lack of cold stability.

Initially we attempted to prevent problems of fat crystallization in blends held in the cold by a prior interesterification treatment. Interesterification effects a redistribution of the fatty acids randomly among the triglycerides in accordance with chance. This would then provide a more intimate compounding of components than could be attained by simple blending of the oils. In these studies, the simple blends served as the controls to evaluate the cold stability of the interesterified blends. In the course of these experiments, we discovered that the blends made according to our formulation, as specified above, had in fact much better cold test values than the interesterified mixtures. The blends were simple mixtures of triglycerides as they existed in the individual oils and yet, to our great surprise, such mixtures of the specified components in the quantities indicated gave cold stability results approximately equal to corn oil. We do not know the fatty acid distribution among the triglycerides in corn oil, nor do we know this distribution among the triglycerides in the blends of the present invention. That these distributions among the oils (corn oil versus our blends) are different is a reasonable expectation; that the cold stabilities are comparable was totally unexpected.

The resultant oil blends of our invention have essentially the same fatty acid composition as corn oil, and hence have nutritive porperties similar to corn oil. Their performance as flavor-stable cooking or salad oils is substantially the same as that of corn oil. Of major importance is the superior appearance of our oil blends when compared to the commercially-available vegetable oils; when stored under refrigeration in the home, our oil blends, like corn oil, show no heavy crystalline deposit characteristics of peanut oil, cottonseed salad oil, and the lightly hydrogenated winterized soybean oil of commerce. Our novel oil blends may be employed in any of the ways a stable vegetable oil is used, such as, for example, as a component in mayonnaise or other salad dressings, or as the liquid fraction of compounded shortening or margarine oil, or simply as a liquid cooking or salad oil. After six months storage under conditions found in the grocery store with regard to exposure to light and temperature, our novel oil blends have been found to have the same flavor stability as a well-known commercially available refined corn oil of the same age and similarly exposed.

The following examples will more fully illustrate the invention. They are presented for illustrative purposes only and should not be construed as limiting the scope of the invention except with respect to the limits specifically named. All parts and percentages are by weight unless otherwise specified.

EXAMPLE 1

Refined soybean oil of 136 iodine value was hydrogenated at about 220° F. and at 25 lbs. pressure to an iodine value of 114, using a copper-activated nickel catalyst. The catalyst was filtered out, and the oil was then cooled to 45° F. over a period of 24 hours, after which it was permitted to stand at this temperature for an additional 48 hours. The solid components were then removed by filtration.

The resultant oil contained no conjugated dienoic, no conjugated trienoic, and no conjugated tetraenoic acid components.

Then, 12,250 lbs. of the modified soybean oil (35% by weight of the blend), 14,000 lbs. of refined, bleached safflower oil (40% by weight of the blend), 7,000 lbs. of refined, bleached, winterized cottonseed oil (20% by weight of the blend), and 1,750 lbs. of refined, bleached peanut oil (5% by weight of the blend), were blended together.

The blend was deodorized in a conventional manner in the presence of 5 p.p.m. of methyl silicone, after which about 7.5 lbs. of isopropyl citrate (0.02% by weight of the blend) and about 7 lbs. of oxystearin (0.02% by weight of the blend) were added. In Table I are listed values obtained in testing the component oils.

Oils of very high $P/S$ ratio, such as safflower and sunflower, and corn oil also, frequently show a very slight cloud in the cold test at an early period, viz, after about 10 hours, but no further increase during subsequent long holding, viz, after an additional 60 hours. This is due to the precipitation not of stearines or triglyceride of relatively high melting point but of an exceedingly small amount of waxes. The latter may be removed by a quick chilling and filtration of the oil to provide the 70+ cold test values or the oils may be used without this prior treatment since dilution of the unremoved waxes by the other oil components in the blend make their presence difficult to detect by the user of the oil blend.

TABLE I.—COMPONENT OILS USED IN THE PRESENT INVESTIGATION

| Oil identity | Iodine value | Fatty acid composition [1] | | $P/S$ ratio | Cold test value, hrs. at 32° F. |
|---|---|---|---|---|---|
| | | Polyunsaturates (P) | Saturates (S) | | |
| | | Percent of triglycerides | | | |
| Safflower oil | 141.2 | 71.0 | 11.2 | 6.3 | 70+ |
| Sunflower oil | 133.7 | 63.0 | 13.2 | 4.8 | 70+ |
| Modified soybean oil | 117.5 | [2] 43.5 | 13.3 | 3.3 | 16 |
| Winterized cottonseed oil | 114.2 | 53.8 | 23.2 | 2.3 | 15 |
| Peanut oil | 95.8 | 32.6 | 22.2 | 1.5 | 0 |

[1] Determined by the spectrophotometric method described by Brice et al, Jour. Amer. Oil Chem. Soc., 29, 279-287 (1952); the remaining fatty acids in the triglycerides are almost entirely oleic acid.
[2] Includes 4.4% linolenic acid.

The composition and physical characteristics of the resultant oil blend were then compared with those of a well-known commercially available refined corn oil. The analytical and functional comparisons are set forth in Table II, where the corn oil is identified as "typical corn oil." The corn oil and oil blend were then used for frying foods and as salad oils; their performances were identical. The same oil blend, made without the oxystearin, was still superior to the other commercially available salad oils (peanut, cottonseed and modified soybean) in cold stability; when some stearine finally formed, it remained predominantly in suspension.

EXAMPLE 2

A blend was prepared as in Example 1 but this time sunflower oil at level of 45% by weight of the blend was used in place of the safflower oil. The modified soybean oil was again included as 35% by weight, the winterized cottonseed oil was now added as 15% by weight, and the peanut oil was again present as 5% by weight of the blend. The deodorized blend, with and without the additives, was almost a duplicate of Example 1 in composition and physical properties (see Table II).

EXAMPLE 3

A blend was prepared as in Example 1, but this time the components were in the proportions of 45 parts of the safflower oil, 25 parts of the modified soybean oil, 20 parts of the cottonseed oil, and 10 parts of the peanut oil. These oils were mixed and then deodorized. In this case, 0.03 part of the oxystearin was added of necessity in order to obtain an acceptable cold test performance. Table II includes the findings with Example 3.

TABLE II.—OIL BLENDS PREPARED IN THE COURSE OF THE PRESENT INVESTIGATION

| Criterion | Typical corn oil | Oil blends of the present invention | | | | | Unacceptable oil blends | | |
|---|---|---|---|---|---|---|---|---|---|
| | | Example 1 | Example 2 | Example 3 | Example 4 | Example 5 | Example 6 | Example 7 | Example 8 |
| Iodine value | 125.0 | 125.1 | 123.2 | 125.3 | 126.0 | 127.0 | 124.7 | 123.0 | 123.4 |
| Polyunsaturated [1] (P): | | | | | | | | | |
| Linoleic, percent | 54.0 | 54.8 | 51.8 | 55.9 | 54.3 | 55.6 | 55.6 | 55.7 | 54.6 |
| Linolenic, percent | 0.9 | 1.4 | 1.5 | 1.1 | 1.8 | 1.6 | 1.3 | 0.0 | 0.8 |
| Total (P) | 54.9 | 56.2 | 53.3 | 57.0 | 56.1 | 57.2 | 55.9 | 55.7 | 55.4 |
| Saturated [1] (S), percent | 12.6 | 15.1 | 15.2 | 15.1 | 14.3 | 14.0 | 15.3 | 15.6 | 15.8 |
| $P/S$ ratio | 4.4 | 3.7 | 3.5 | 3.8 | 3.9 | 4.1 | 3.7 | 3.6 | 3.5 |
| Cold test, hrs. at 32° F. | 70 | 45 | 47 | 26 | 41 | 46 | 8 | 0–2 | 10 |
| Coldd ttest, hrs. at 32° F. | 70 | 45 | 47 | 26 | 41 | 46 | 8 | 0–2 | 10 |
| Subsequent observations | [2] | [2] | [2] | [3] | [4] | [5] | [6] | [6] | [6] |

[1] Fatty acid composition expressed as percent of triglycerides according to the spectrophotometric method cited earlier.
[2] No increase in precipitate during a total of 130 hours observation.
[3] Slight increase in precipitate during a total of 100 hours observation.
[4] Slight increase in precipitate during a total of 130 hours observation.
[5] No increase in precipitate during a total of 100 hours observation.
[6] Progressive increase in precipitate during a total of 60 hours observation.

EXAMPLE 4

A blend was prepared as in Example 1 but this time 41 parts of the modified soybean oil, 40 parts of the safflower oil, 17 parts of the cottonseed oil, and 2 parts of the peanut oil were mixed and then deodorized. In this case 0.03 part of the oxystearin was added in order to obtain a high cold test performance. Table II includes the findings with Example 4.

From the results obtained with Examples 3 and 4, it has been concluded that a change in the concentration of the peanut oil from that in Example 1, the concentration still being within the limits specified, must be paired off with a reciprocal change of about twice the amount in the concentration of the modified soybean oil in the blend.

EXAMPLE 5

A blend was prepared as in Example 1 but this time 45 parts of the safflower oil, 37 parts of the modified soybean oil, 15 parts of the cottonseed oil, and 3 parts of the peanut oil were mixed and then deodorized. In this case, no oxystearin was added. A cold test of 46 hours was obtained. The stearine present did not significantly change until after 100 hours when progressively increased precipitation was noted. Table II includes the findings with Example 5.

EXAMPLE 6

This example illustrates the uniqueness of the fatty acid distribution among the triglycerides in Examples 1 to 5. The oil blend of Example 1 was interesterified according to the procedure described by D. Melnick and C. M. Gooding, U.S. Pat. No. 2,921,855, issued Jan. 19, 1960, which tends to lower dramatically the melting point of blends without changing fatty acid composition. The data in Table II apply to the interesterified oil. An unacceptable cold test value of 8 hours at 32° F. was obtained, whereas the oil in Example 1, even without the oxystearin, had a cold test value of 29 hours.

EXAMPLE 7

This example illustrates further the uniqueness of the fatty acid distribution among the triglycerides in Examples 1 to 5. A blend of 60 parts by weight of the safflower oil and 40 parts by weight of the peanut oil was prepared and deodorized. This blend also had a fatty acid composition very close to that of corn oil but exhibited cold test values of less than 1.0 hour without the oxystearin and 1.0 to 2.0 hours after the oxystearin addition.

EXAMPLE 8

This example illustrates in still another way the uniqueness of the fatty acid distribution among the triglycerides in Examples 1 to 5. A blend of 45 parts by weight of the safflower oil, 25 parts by weight of the winterized cottonseed oil, 15 parts by weight of the modified soybean oil, and 15 parts by weight of the peanut oil was prepared and deodorized. This blend was found to be comparable to corn oil in fatty acid composition but again was rejected because of the low cold test value of only 10 hours at 32° F.; following interesterification, which results in no change in fatty acid composition, the cold test value was reduced to less than one hour at 32° F.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbelow set forth, and as fall within the scope of the invention and the limits of the appended claims.

We claim:

1. As a new composition of matter, a liquid, edible vegetable oil blend having an iodine value between 120 and 130, a $P/S$ ratio of 3.5 to 4.5, and a cold test value in excess of 20 hours at 32° F., said oil blend consisting essentially of a blend of the following refined, bleached oils:
   (a) from 35% to 45% by weight of a vegetable oil, other than corn oil, which has a $P/S$ ratio in excess of 4.5;
   (b) from 25% to 50% by weight of a lightly hydrogenated and winterized soybean oil of 100 to 120 iodine value;
   (c) from 15% to 25% by weight of winterized cottonseed oil; and
   (d) from 2% to 10% by weight of peanut oil.

2. A composition in accordance with claim 1 wherein the said vegetable oil component of $P/S$ ratio in excess of 4.5 is safflower oil.

3. A composition in accordance with claim 1 which additionally contains a small amount of a crystallization inhibitor.

4. A composition in accordance with claim 3 wherein said crystallization inhibitor is oxystearin.

5. A composition in accordance with claim 2 which additionally contains a small amount of oxystearin.

6. A composition in accordance with claim 1 wherein the said vegetable oil component of $P/S$ ratio in excess of 4.5 is sunflower oil.

7. A composition in accordance with claim 6 which additionally contains a small amount of oxystearin.

8. As a new composition of matter, a liquid, edible vegetable oil blend having an iodine value between 123 and 128, a $P/S$ ratio of 3.5 to 4.5, and a cold test value in excess of 30 hours at 32° F., said oil blend consisting essentially of a blend of the following refined, bleached oils:
   (a) from 38% to 42% by weight of a vegetable oil, other than corn oil, which has a $P/S$ ratio in excess of 4.5;
   (b) from 30% to 40% by weight of a lightly hydrogenated and winterized soybean oil of 110 to 120 iodine value;
   (c) from 18% to 22% by weight of winterized cottonseed oil; and
   (d) from 3% to 8% by weight of peanut oil.

9. A composition in accordance with claim 8 wherein the said vegetable oil component of $P/S$ ratio in excess of 4.5 is safflower oil.

10. A composition in accordance with claim 8 which additionally contains a small amount of a crystallization inhibitor.

11. A composition in accordance with claim 10 wherein said crystallization inhibitor is oxystearin.

12. A composition in accordance with claim 8 wherein said vegetable oil component of $P/S$ ratio in excess of 4.5 is sunflower oil.

13. A composition in accordance with claim 12 which additionally contains a small amount of oxystearin.

14. A composition in accordance with claim 8 wherein the blend consists essentially of:
   (a) about 40% of the vegetable oil component of $P/S$ ratio in excess of 4.5;
   (b) about 35% of the said soybean oil;
   (c) about 20% of the winterized cottonseed oil; and
   (d) about 5% of the refined peanut oil.

15. A composition in accordance with claim 14 wherein the said vegetable oil component consists of safflower oil.

16. A composition in accordance with claim 15 that also contains a small but effective amount of oxystearin as a crystallization inhibitor.

References Cited

UNITED STATES PATENTS

| | | | |
|---|---|---|---|
| 2,627,469 | 2/1953 | Melnick et al. | 99—118 X |
| 3,186,854 | 6/1965 | Going | 99—163 |

MAURICE W. GREENSTEIN, Primary Examiner

U.S. Cl. X.R.

99—144